(No Model.) 3 Sheets—Sheet 1.

J. E. PITRAT.
WEIGHING AND PRICE SCALE.

No. 344,857. Patented July 6, 1886.

Witnesses
Sam'l R. Turner
R. W. Bishop

Inventor
Julius E. Pitrat
By R. S. & A. P. Lacey
Att'ys.

(No Model.) 3 Sheets—Sheet 2.
J. E. PITRAT.
WEIGHING AND PRICE SCALE.
No. 344,857. Patented July 6, 1886.
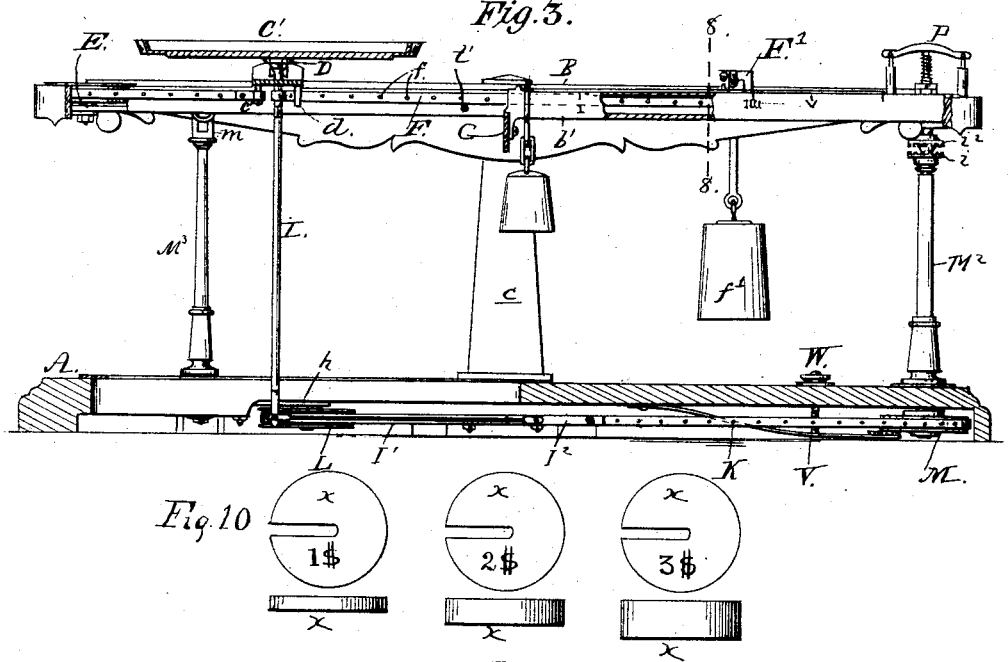
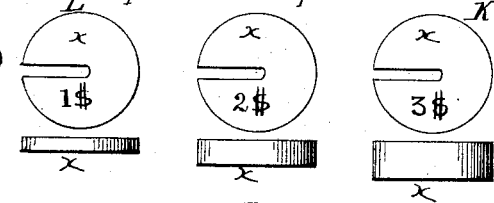
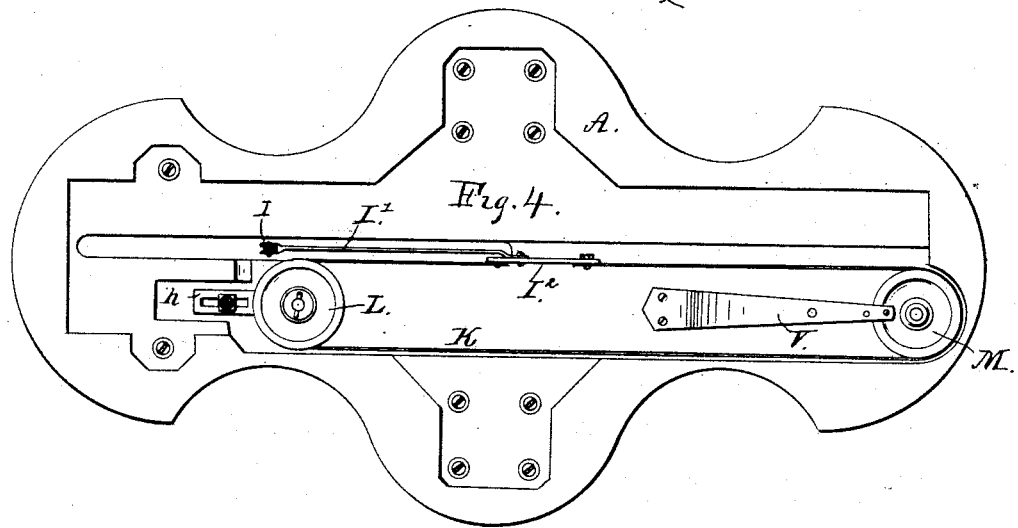
Witnesses.
Saml R. Turner
R. W. Bishop.
Inventor
Julius E Pitrat
By R.S. & A.P. Lacey
Attys.

(No Model.) 3 Sheets—Sheet 3.
J. E. PITRAT.
WEIGHING AND PRICE SCALE.
No. 344,857. Patented July 6, 1886.
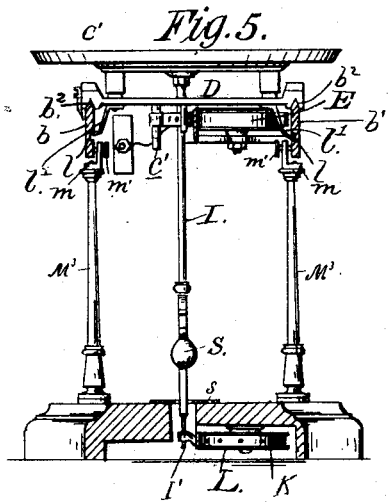
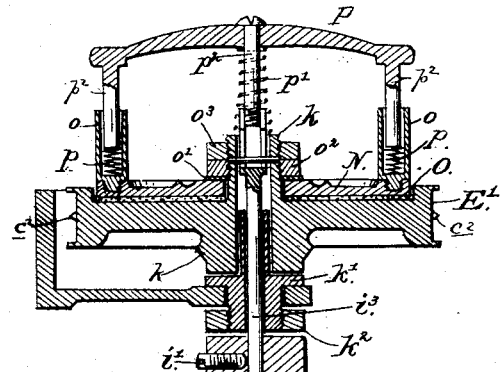
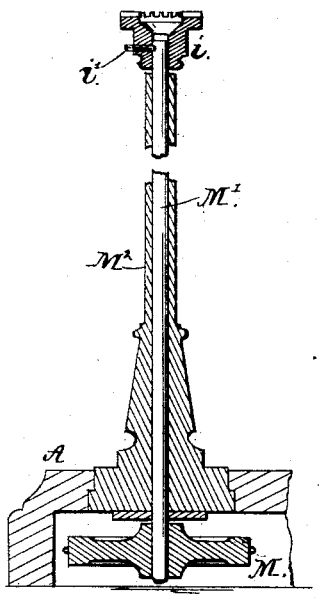
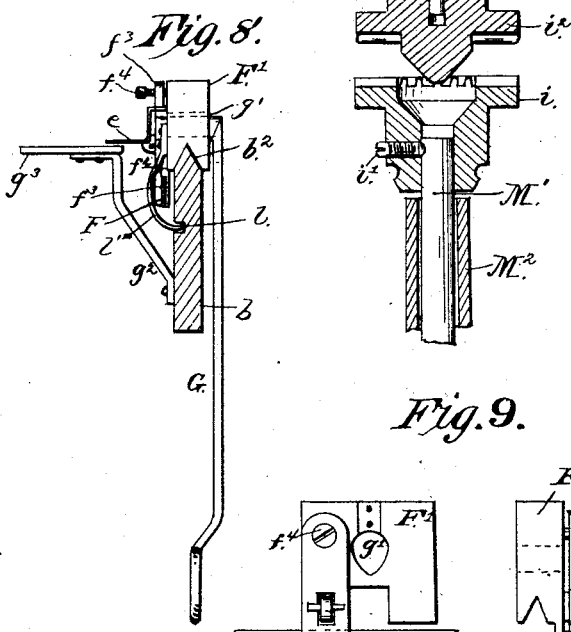
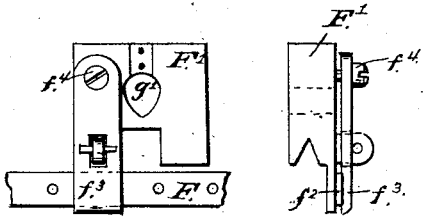
Witnesses
Saml R. Turner
R. W. Bishop
Inventor
Julius E. Pitrat
By R. S. & A. Lacey
Attys.

UNITED STATES PATENT OFFICE.

JULIUS E. PITRAT, OF GALLIPOLIS, OHIO.

WEIGHING AND PRICE SCALE.

SPECIFICATION forming part of Letters Patent No. 344,857, dated July 6, 1886.

Application filed July 20, 1885. Serial No. 172,112. (No model.)

*To all whom it may concern:*

Be it known that I, JULIUS E. PITRAT, a citizen of the United States, residing at Gallipolis, in the county of Gallia and State of Ohio, have invented certain new and useful Improvements in Weighing and Price Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in scales, and is designed as an improvement on the device patented by me March 31, 1885, and numbered 314,717.

It has for its object to simplify, facilitate, and accelerate the work of operating the same; and it consists, essentially, in providing mechanical means to shift the counterpoise-beam, weights, and scale-pan from a fixed point, and in the novel features of construction and combination of the parts, whereby the scale-pan and its counterpoise may be simultaneously adjusted to and from the fulcrum of the scale-beam, as more fully shown, and hereinafter set forth and claimed.

My invention is clearly illustrated in the accompanying drawings, which form a part of this specification, and in which—

Figure 1:
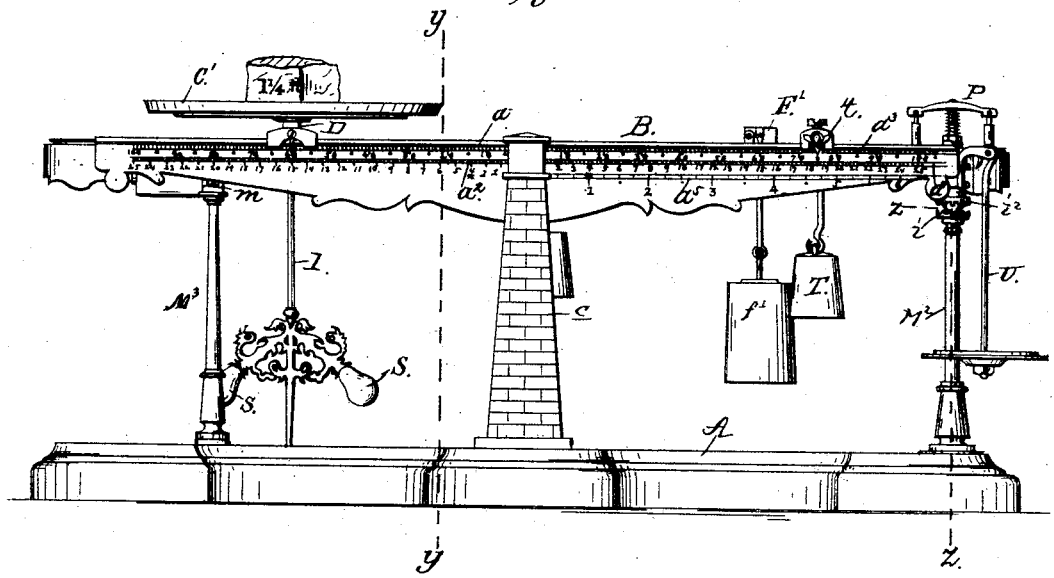
Figure 2:
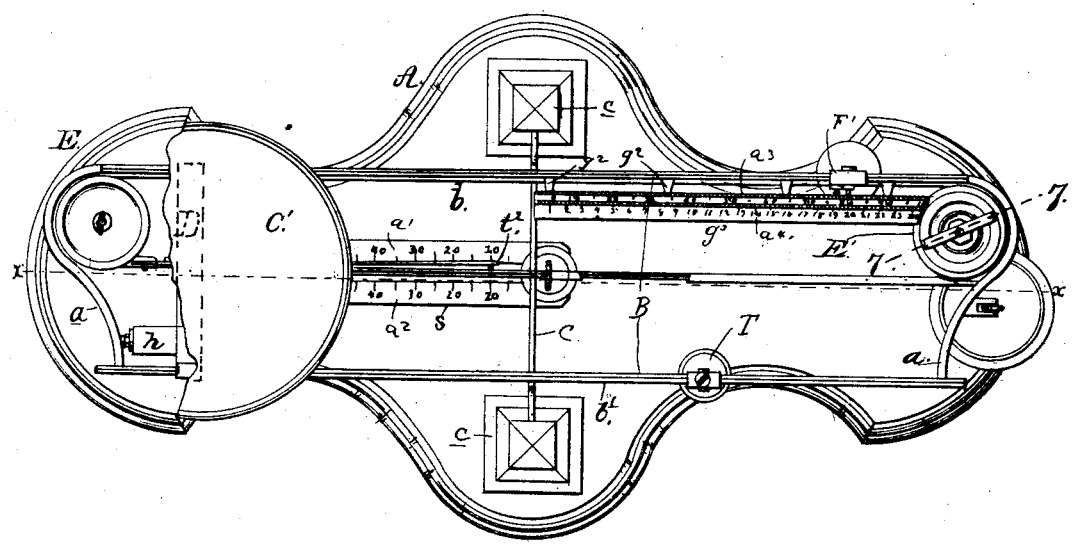

Figure 1 is a side view of a scale embodying my improvements. Fig. 2 is a top plan view of the same with the scale-pan broken away. Fig. 3 is a vertical longitudinal section on the line X X of Fig. 2. Fig. 4 is a bottom plan. Fig. 5 is a detached section on the line Y Y of Fig. 1. Fig. 6 is a vertical detached section on the line Z Z of Fig. 1. Fig. 7 is an enlarged sectional detail taken through the line 7 7 of Fig. 2. Fig. 8 is a section on the line 8 8 of Fig. 3. Fig. 9 shows a side and end view of the weight-supporting clamp. Fig. 10 represents the dollar-weights.

Referring to the drawings by letter, A indicates the base, which may be of any desired form.

B is a scale beam or lever formed, preferably, of two parallel beams, $b\ b'$, graduated alike, and connected together at their ends by the rods $a\ a$, which are of peculiar form, to provide space for the wheels, hereinafter described. These beams are provided midway between their ends with pivots C, preferably knife-edged, and which are supported in uprights $c$, or may be suspended from above, as desired. Uprights or standards $M^2\ M^3\ M^3$, at each end of the base, respectively, serve to limit the movement of the scale-beam. Brackets $m$ are secured to the standards $M^3$. The vertical limb of each of these brackets is slotted, and a set-screw, $m'$, passes through said slot into the beam. This construction prevents any straining of the beam-supporting fulcrum, which might be occasioned by any lateral motion of the beam, as is manifest.

The lever is graduated as follows: Its arm to the left of its support is provided with two graduations, $a'\ a^2$. The right arm of the lever is provided with an upper and lower graduation, $a^3\ a^4$, corresponding with the graduations $a'\ a^2$, and also with a third graduation, $a^5$, for use in ordinary weighing, as will be described.

In carrying out my improvement I dispense, whenever practicable, with the nicks or notches in the edges of the beams or levers, and leave the upper edges thereof perfectly straight and smooth; and this edge I make either of a round or conical form, preferably conical, as shown at $b^2$, in Figs. 5 and 8, so as to afford a better bearing for the carriage of the scale-pan and the counterpoise slide-blocks, thereby preventing lateral displacement of the same.

C' is the scale-pan, of ordinary construction, but instead of resting directly upon the lever, as in my patent above referred to, is supported upon a cross-bar, D, which I shall term the "carriage." This bar is recessed or grooved upon its under edge near each end, to embrace and receive the upper edge of the beams $b\ b'$, on which it rests and along which it slides.

$c'$ is a pin depending centrally from the under side of the carriage, near one edge thereof.

E is a grooved pulley secured in any convenient manner near one end of the beam $b$ in the bend of the connecting-bar $a$, and E' is another pulley at the opposite end of said beam and running horizontally and on a level with the pin $c'$.

F is a flat metal band or belt provided along its center line with a series of perforations, $f$. This belt is attached at one end to the pin $c'$ of the carriage, then passes around the pulley E, thence to and around the pulley E', and back to the carriage, where its other end is attached to the pin $d$, depending from the under side of the bar D, upon the edge opposite the pin $c'$, as clearly shown in Fig. 3. The pulley E' is supplied with a crank-pin; and it also has around its periphery a number of spikes, $c^2$, arranged in a single row, as shown, and at such a distance apart as to correspond with the perforations in the band F and engaging therewith, so that when the pulley is turned by the mechanism soon to be described, the carriage, scale-pan, &c., will travel along the beam in one direction or the other, according to the direction in which the said pulley is turned.

To the band F is fastened in any convenient manner a sliding-block, F', resting on and adapted to slide upon the lever-beam $b$, between its fulcrum and the pulley E', and to this block is attached the counterpoise $f'$. This block is shown in detail in Fig. 8. It is provided with an extension or leg, $f^2$, between which and the bar $f^3$, secured at the top to the block F' by a set-screw, $f^4$, the band is fastened. The rod G of the counterpoise $f'$ is pivoted at its upper end in the recess $g'$ in the block F'. This sliding block is provided with an index-finger or pointer, $e$, extending at right angles from its edge. The graduations are not formed on the back lever, $b$, but on a bar, $g^3$, at right angles thereto, as shown in Figs. 2 and 8. This bar is supported by a bracket or brackets, $g^2$, as shown in the latter figure, and its graduations correspond with those on the front arm of the front beam, $b'$.

The cross-bar D is perforated at its center to admit of the passage of the rod I of the scale-pan. This rod is pivotally connected at its lower end to one end of a rod, I', which is attached to a rod, I², which in turn is connected to the endless band K, passing around the pulleys L M. The pulley L is journaled in the adjustable block $h$, by means of which compensation for wear is provided for. This block may be adjusted in any manner; but it is preferred to provide it with a rear extension, slotted to permit the passage of a bolt. By unscrewing the nut on said bolt the block may be adjusted. When in the desired position it may be retained by the screwing home of the nut, as is manifest. The band K is provided with perforations, and in other respects is like the band F, above described, and the pulley M is provided with projections or spurs similar to those on the pulley E', and for a similar purpose. The pulley M is carried by the vertical shaft M', turning loosely within the upright M², and carries on its upper end one half, $i$, of a friction-clutch secured thereto in any convenient way, but preferably by the set-screw $i'$. The other half, $i^2$, of the clutch is carried by the shaft $i^3$, passing loosely through the hub $k$ of the pulley E', and through the collar $k'$ and the nut $k^2$.

N is a disk or cap surmounting the pulley E', which is dished to receive it, and between the meeting faces of the two is placed a layer or layers of felt, leather, or other suitable material, O. Tubes $o$ are screwed into opposite sides of the disk N, and the upper end of the shaft $i^3$ is connected to the hub of the wheel or pulley, as shown.

$o'$ is a washer, and $o^2$ $o^3$ screw-nut and jam-nut, by means of which the disk N is secured in place.

P is a yoke or handle, preferably of the form shown.

$p^2$ are pins depending from its opposite ends to coincide with and enter the tubes $o$, and $p$ are coiled springs placed beneath the arms thereof in the tubes $o$, as shown. The use of these springs, as well as of that of the spring $p'$ surrounding the pin $p^2$, will be apparent.

To prevent the jumping off and injury of the loose parts when the balancing-levers receive a shock or jolt in using the scales—such as placing the merchandise into the scale-pan in too abrupt a manner—I provide the scale-beam with a longitudinal groove, $l$, and to the under side of the carriage D fasten springs $l'$, one at each end thereof, the free ends of said springs resting in said groove. Similar springs may be attached to the sliding block F', if deemed necessary, but they will seldom be required.

In order that the device may be used without the lower band, K, and pulleys L M, I attach to the lower end of the scale-pan rod I weights S, one on each side and in line of vibration of the same, so that when the rod I' is disconnected from said rod the scale-pan will assume and maintain a horizontal position without any care or attention on the part of the operator.

From the foregoing it will be seen that the band K, its supporting-pulleys, connections with the lower end of the rod I, and the operating mechanism are used simply to carry the lower end of the rod I to and fro simultaneously with the movements of the scale-pan, whereby the latter is preserved in a true horizontal position and prevented from tilting. The weights S are an equivalent device for the same purpose, and may be used in connection therewith or alone as preferred. These devices are included under and will be designated by the term "carrier," as the function of each is the same.

The bob or price-indicating weight T is carried by a sliding block, and is provided with a pointer, $t$.

U is a weight-carrier, of the usual construction, to receive the additional price-weights X. (Shown in Fig. 10.)

To insure the accurate arrangement and adjustment of the parts I I' I², I graduate the base, as at $s$, adjacent to the lower end of the rod I. This graduation corresponds with the upper graduation on the left arm of the lever. The parts are so disposed that when the scale-pan is set to any point on the beam, the lower end of the rod I may be correspondingly adjusted to a similar point indicated on the base, when the pan will occupy a true horizontal position.

$t'$ is a stop, against which the pin $d$ on the under side of the carriage D is made to impinge and limit the movement of the scale-pan, and fix its position when it is desired to weigh sixteen ounces to the pound.

Beneath the base I attach a friction-brake, V, operating against the face of the pulley M.

W is a set-screw projecting above the base and bearing on the said brake, by means of which the tension of said brake may be regulated.

The upper set of graduations $a'$ $a^3$ indicate the price or valuation of the article weighed, and they are marked decimally, counting to the left and right of the fulcrum of the lever, respectively. The tenths are simply indicated by short strokes, the fifths by dots under the short strokes, as clearly indicated. In practice this manner of indication may be varied, as desired.

The operation of the scales is as follows: Suppose, for instance, the article in the scale-pan is worth sixty cents per pound and its weight unknown. The band F is turned by means of the handle P and mechanism above described until the pointer of the scale-pan is over the sixth decimal or sixty-cent mark on the left arm of the lever. At the same time and by the same movement the counterpoise, being connected to and moving with the band, is moved in an opposite direction on the right arm of the lever until its pointer is brought to the corresponding decimal or sixty-cent mark on that side. Now, by adjusting the bob-weight T outward along the right arm of the lever it will balance the pan and contents when the price is reached, which, as shown, is seventy-five cents, indicated by the seventh decimal and the dot. If, on the other hand, it is desired to weigh out seventy-five cents worth of any article costing sixty cents, the reverse of this operation will be pursued. The bob-weight will be placed at seventy-five and the band turned until the scale-pan and counterpoise are at sixty, when the article will be supplied to the pan until it balances the bob-weight T. When it is desired to weigh a small quantity—say seven, eight, twelve, and thirteen cents worth, &c.—the lower set of graduations on the left and the middle set on the right are used; and when the prices go above one dollar the proper weight, X, may be applied to the weight-carrier U, suspended from the weight-arm of the lever. When it is desired to weigh by pounds, &c., in the usual manner, the band F is moved until the pin $d$, depending from the bottom of the carriage D, impinges against the stop $t'$, when, by adjusting the bob T with reference to the graduations $a^5$ on the right arm of the lever, any number of pounds may be weighed off, as will readily be understood.

Although, when operating with my scales, the pan should always be put in proper position before the article or merchandise is placed on the pan, still it often happens that the merchandise will be placed there first. If such be the case, and its weight great, it is obvious that unless the article be removed from the pan, the friction between the sliding surfaces under the carriage would be great in proportion, and an undue strain would be given to the band, &c., and probably result in breakage were it not for the disk N and the felt or leather placed between it and the pulley E', the pressure on the cushion or felt being so regulated that the disk N will slip on the pulley E' when the carriage is unduly loaded.

I do not limit myself to the exact construction herein shown and described, as it is evident that the same may be varied to a certain extent without departing from the spirit of my invention. For instance, instead of the perforated band described, I may sometimes prefer to use a chain, the spurs or projections on the pulleys operating in the links in the same way that they do in the perforations in the belt or band.

Having thus described my invention and set forth its merits, what I claim as new, and desire to secure by Letters Patent, is—

1. The combination of a lever pivoted midway between its ends, a scale-pan on one side of the pivot of said lever, a counterpoise sliding on said lever on the other side of the fulcrum, and means consisting of pulleys at each end of the lever and an endless band passed around the pulleys, and having its opposite sides attached to the pan and counterpoise, respectively, for mechanically moving said counterpoise and pan in opposite directions, substantially as and for the purposes specified.

2. The combination, in a scale, with a graduated lever and the scale-pan constructed to travel thereon, of a perforated endless belt attached to said scale-pan, a pulley having projections engaging the perforations in said belt, a rotatable disk to frictionally contact with the pulley, and means for rotating said disk, substantially as set forth.

3. The combination, in a scale, of a graduated lever, a scale-pan, an endless perforated belt, a counterpoise attached to said belt, a pulley having projections to engage the perforations in said belt, and a friction device consisting of a disk surmounting the pulley and in frictional contact therewith, and provided with a handle for imparting motion to said belt, as set forth.

4. The combination, in a scale, of a graduated lever, a pulley located near each end thereof, an endless perforated band passing around said pulleys, a scale-pan attached to said band upon one side of the fulcrum of the lever, a counterpoise-support having a leg-extension, and a bar secured by a set-screw against said extension to clamp the band upon the opposite side of said fulcrum, and means for imparting motion to said band to move said pan and counterpoise-support simultaneously to or from said fulcrum, as set forth.

5. The combination, in a scale, of a lever longitudinally grooved in its side, a carriage constructed to travel thereon and supporting the scale-pan, a pulley located near each end of said lever, a band passing around said pulleys and having its ends attached to opposite sides of said carriage, a sliding block attached to said band and carrying the counterpoise, a spring attached to said block, having its free end working in the groove in the lever, and means, substantially as described, for imparting motion to said band, as and for the purposes specified.

6. The combination, in a scale, of a lever having a longitudinal groove, a scale-pan supporting-carriage free to slide on said lever, and a spring attached to said carriage and depending therefrom with its free end resting in said slot, as and for the purposes specified.

7. The combination, with the lever, the shifting scale-pan mounted thereon, and a rod depending from the scale-pan, of a carrier connected with the rod to move its lower end simultaneously with and in the direction of the adjustment of the scale-pan, to preserve and always maintain the latter in a true horizontal position, substantially as and for the purposes set forth.

8. The combination, with the shifting scale-pan, the movable counterpoise, and endless band for moving both, of an endless carrier connected with a rod depending from the scale-pan, provisions for connecting the upper and lower bands to actuate both simultaneously, and a friction-brake connected with the lower band to prevent its continued motion when suddenly disconnected from the upper band.

9. The combination of the scale-pan, a rod depending therefrom, an upper and lower set of pulleys, an endless carrier passing around each set of pulleys and connected with the scale-pan and rod, respectively, a two-part shaft in axial line, each shaft keyed to an upper and lower pulley, the one shaft being movable to and from the other, and a half-clutch attached to each of their adjacent ends, substantially as and for the purposes specified.

10. In a scale, the combination of the beam, scale-pan, its counterpoise, upper and lower sets of pulleys, endless bands, an upper and lower shaft, each keyed to an upper and lower pulley, a half-clutch attached to each adjacent end of the shafts, a friction-disk surmounting the upper pulley, and a handle movable to and from the disk to rotate it, and contacting with the upper shaft to cause the same to follow the movements of the handle, to effect a union or separation of the two shafts, substantially as described, and for the purposes specified.

In testimony whereof I affix my signature in presence of two witnesses.

JULIUS E. PITRAT.

Witnesses:
A. F. MOORE,
LOUIS BAER.